US012794722B1

(12) United States Patent
King et al.

(10) Patent No.: US 12,794,722 B1
(45) Date of Patent: Nov. 10, 2026

(54) ASSOCIATING ALTERNATE DEVICES TO A USER IN A TELECONFERENCE WITH MULTIPLE PARTICIPANTS

(71) Applicant: 8x8, Inc., Campbell, CA (US)

(72) Inventors: Mark Benedetto King, Boston, MA (US); Jedidiah Brown, Seattle, WA (US)

(73) Assignee: 8x8, Inc., Campbell, CA (US)

( * ) Notice: Subject to any disclaimer, the term of this patent is extended or adjusted under 35 U.S.C. 154(b) by 104 days.

(21) Appl. No.: 17/573,440

(22) Filed: Jan. 11, 2022

Related U.S. Application Data

(60) Provisional application No. 63/137,041, filed on Jan. 13, 2021.

(51) Int. Cl.
*H04L 12/18* (2006.01)
*H04L 9/40* (2022.01)
*H04L 65/1076* (2022.01)

(52) U.S. Cl.
CPC .......... *H04L 12/1822* (2013.01); *H04L 63/08* (2013.01); *H04L 63/10* (2013.01); *H04L 65/1076* (2013.01)

(58) Field of Classification Search
CPC ..... H04L 12/1822; H04L 63/08; H04L 63/10; H04L 65/1076; H04L 12/1813; H04L 65/403; H04L 51/04; H04N 7/15; H04N 21/4788; H04N 21/2187
See application file for complete search history.

(56) References Cited

U.S. PATENT DOCUMENTS 6,683,858 B1 * 1/2004 Chu .................... H04L 12/6418 370/263
8,892,079 B1 * 11/2014 Nace ...................... H04N 7/147 455/414.2
11,132,110 B1 * 9/2021 Christensen ............. H04N 7/15
2007/0124382 A1 * 5/2007 Hughes .................. H04N 7/152 709/205
2008/0137690 A1 * 6/2008 Krantz ................. H04Q 3/0025 370/493
2009/0133090 A1 * 5/2009 Busse ................ H04N 21/4755 725/132
2009/0260064 A1 * 10/2009 McDowell .......... H04L 63/0876 726/4
2010/0085416 A1 * 4/2010 Hegde .................... H04N 7/157 348/E7.083
2010/0208634 A1 * 8/2010 Eng ..................... H04L 43/0876 370/352
(Continued)

*Primary Examiner* — Madhu Woolcock
(74) *Attorney, Agent, or Firm* — Vista IP Law Group, LLP

(57) ABSTRACT

A method for associating alternate devices to a user in a teleconference with multiple participants is provided. The method includes receiving, from a first client device associated with a first participant in a teleconference, a request to couple an alternate device to a feed from the first participant into the teleconference, providing, to the alternate device, a code to access the teleconference, the code associated with the feed from the first participant, receiving, from the alternate device, a request to provide a data stream into the feed from the first participant, the request comprising the code to access the teleconference, and adding the data stream from the alternate device and a data stream from the first client device to the feed from the first participant in the teleconference.

20 Claims, 11 Drawing Sheets

(56) References Cited

U.S. PATENT DOCUMENTS

2010/0290365 A1* 11/2010 Kwong ................. H04M 7/006 370/254
2011/0035784 A1* 2/2011 Jakobsson ........... H04L 63/1466 726/2
2011/0302607 A1* 12/2011 Warrick ........... H04N 21/41265 725/39
2012/0117590 A1* 5/2012 Agnihotri ............ H04N 21/441 725/30
2012/0254649 A1* 10/2012 Vonog ...................... H04N 7/15 713/400
2012/0262537 A1* 10/2012 Baker ...................... H04N 7/15 348/E7.083
2013/0198635 A1* 8/2013 Jones .................... G06F 3/0486 715/727
2013/0262686 A1* 10/2013 Hill ..................... H04L 65/4038 709/228
2014/0025740 A1* 1/2014 Jaudon .................. H04L 65/401 709/204
2014/0073252 A1* 3/2014 Lee ................... H04M 1/72412 455/41.2
2014/0108288 A1* 4/2014 Calman .................. H04N 7/155 705/342
2014/0149563 A1* 5/2014 Ono .................... H04L 41/0846 709/222
2014/0156854 A1* 6/2014 Gaetano, Jr. .......... H04L 65/403 709/227
2014/0313282 A1* 10/2014 Ma ......................... H04N 7/141 348/14.09
2014/0359735 A1* 12/2014 Lehmann ............ H04L 63/0884 709/227
2015/0237306 A1* 8/2015 Feng ........................ H04N 7/15 348/14.09
2015/0295769 A1* 10/2015 Anderson ............... H04L 65/80 370/254
2015/0349971 A1* 12/2015 Sinha ...................... H04W 4/02 370/260
2016/0105472 A1* 4/2016 Chitroda ............. H04L 65/1094 709/204
2016/0112980 A1* 4/2016 Pai ........................ H04L 63/205 455/435.1
2016/0150184 A1* 5/2016 Gandhi .................... H04N 7/15 348/14.08
2016/0173705 A1* 6/2016 Nordstrom ............. H04N 7/141 348/207.1
2016/0212178 A1* 7/2016 Zhang ................... H04L 65/403
2017/0093875 A1* 3/2017 de Freitas ............. H04W 12/06
2018/0083978 A1* 3/2018 Pantazelos ............ H04W 12/06
2018/0343135 A1* 11/2018 Cheung ............. H04M 3/42127
2018/0359106 A1* 12/2018 Moorefield, Jr. ..... H04L 65/403
2019/0289653 A1* 9/2019 Sarkar ..................... H04W 4/80
2020/0359349 A1* 11/2020 Duo ...................... H04W 60/04
2021/0044645 A1* 2/2021 Jayaweera .............. H04L 65/75
2021/0058517 A1* 2/2021 Serbajlo .............. H04L 12/1827
2021/0136130 A1* 5/2021 Ponnusamy ........ H04L 12/1822
2021/0158636 A1* 5/2021 Olshansky ......... G06Q 10/1053
2021/0218590 A1* 7/2021 Akhoury ............. H04L 12/1818
2021/0352359 A1* 11/2021 Barvo ................ H04N 21/2187
2022/0006857 A1* 1/2022 Sun ....................... H04L 67/101
2022/0038657 A1* 2/2022 Ling ...................... H04N 7/147
2022/0150446 A1* 5/2022 Fernandez ............. H04N 7/147

* cited by examiner

ASSOCIATING ALTERNATE DEVICES TO A USER IN A TELECONFERENCE WITH MULTIPLE PARTICIPANTS

CROSS-REFERENCE TO RELATED APPLICATIONS

The present disclosure is related and claims priority under 35 USC 119(e) to U.S. Prov. Pat. Appln. No. 63/137,041, entitled ASSOCIATING ALTERNATE DEVICES TO A USER IN A TELECONFERENCE WITH MULTIPLE PARTICIPANTS, to Mark B. KING, et-al., filed on Jan. 13, 2021, the contents of which are herein incorporated by reference in their entirety, for all purposes.

BACKGROUND

Field

The present disclosure generally relates to improving teleconferencing applications by seamlessly allowing participants to link in alternate devices. More specifically, the present disclosure relates to enabling a participant in a teleconference to link an alternate device to the feed of a teleconference associated with the participant or as a general feed for multiple participants.

Description of the Related Art

Current teleconferencing platforms lack the capability of seamlessly adapting to receive feeds from and interact with alternate devices. In some instances, one of the participants may be experiencing a technical problem with the device that is active in the teleconference, and may desire to either switch to an alternate device or use a capability from the alternate device (e.g., audio, video, and the like) to improve the teleconference experience.

SUMMARY

In a first embodiment, a computer-implemented method includes accessing a teleconference using a first client device associated with a first participant. The computer-implemented method also includes requesting, via the first client device, to couple an alternate device associated with the first participant to a feed from the first participant into the teleconference, providing, to the alternate device, a code to access the teleconference, the code associated with the feed from the first participant, receiving, from a server managing the teleconference, a notification that the alternate device has been added to the feed from the first participant, and providing, from the first client device, a data stream to be added to a second data stream from the alternate device in the feed from the first participant in the teleconference.

In a second embodiment, a system includes one or more processors and a memory storing instructions which, when executed by the processors, cause the system to perform operations. The operations include to access a teleconference using a first client device associated with a first participant, to request, via the first client device, to couple an alternate device associated with the first participant to a feed from the first participant into the teleconference, to provide, to the alternate device, a code to access the teleconference, the code associated with the feed from the first participant, to receive, from a server managing the teleconference, a notification that the alternate device has been added to the feed from the first participant, and to provide, from the first client device, a data stream to be added to a second data stream from the alternate device in the feed from the first participant in the teleconference.

In a third embodiment, a computer-implemented method includes receiving, from a first client device associated with a first participant in a teleconference, a request to couple an alternate device to a feed from the first participant into the teleconference. The computer-implemented method includes providing, to the alternate device, a code to access the teleconference, the code associated with the feed from the first participant, receiving, from the alternate device, a request to provide a data stream into the feed from the first participant, the request including the code to access the teleconference, and adding the data stream from the alternate device and a data stream from the first client device to the feed from the first participant in the teleconference.

In another embodiment, a system includes a first means to store instructions and a second means to execute the instructions to cause the system to perform a method. The method includes accessing a teleconference using a first client device associated with a first participant. The method also includes requesting, via the first client device, to couple an alternate device associated with the first participant to a feed from the first participant into the teleconference, providing, to the alternate device, a code to access the teleconference, the code associated with the feed from the first participant, receiving, from a server managing the teleconference, a notification that the alternate device has been added to the feed from the first participant, and providing, from the first client device, a data stream to be added to a second data stream from the alternate device in the feed from the first participant in the teleconference.

In yet another embodiment, a non-transitory, computer-readable medium includes instructions which, when executed by a processor cause a computer to perform a method. The method includes accessing a teleconference using a first client device associated with a first participant. The method also includes requesting, via the first client device, to couple an alternate device associated with the first participant to a feed from the first participant into the teleconference, providing, to the alternate device, a code to access the teleconference, the code associated with the feed from the first participant, receiving, from a server managing the teleconference, a notification that the alternate device has been added to the feed from the first participant, and providing, from the first client device, a data stream to be added to a second data stream from the alternate device in the feed from the first participant in the teleconference.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Teleconferencing has become a common occurrence in the lives of millions of people, and the trend will likely increase. Moreover, mobile devices having high-end capabilities such as video, audio, or even artificial intelligence data processing and voice recognition are more prevalent amongst users who may be participants in a teleconference. In many instances, a participant may encounter a technical difficulty with a first device that is active in a teleconference, and may be desirous to use an alternate device to at least supplement the technical shortcomings of the first device.

Some applications may attempt to solve the above problem by pairing the alternate device with the first device. For example, some approaches may include using a special application to remotely control the alternate device, e.g., via Bluetooth or any other strategy for pairing the alternate device with the first device. However, these solutions are complex because they involve the pairing of two devices separately from the telecommunication event, which may lead to dropped calls or loss of data.

To resolve the above technical problems arising in the field of computer networking and remote collaboration, embodiments as disclosed herein provide the ability to link an alternate device into the teleconference. Accordingly, embodiments as disclosed herein offer the ability for a participant in a teleconference to link an alternate device seamlessly and securely. To do this, embodiments as disclosed herein use the ability of many alternate devices to couple with a network via a separate channel from the first device, so that the telecommunication application may handle the alternate device data independently from the first device, and later add the data stream from the alternate device into the feed for the first participant, synchronously.

Example System Architecture

Figure 1:
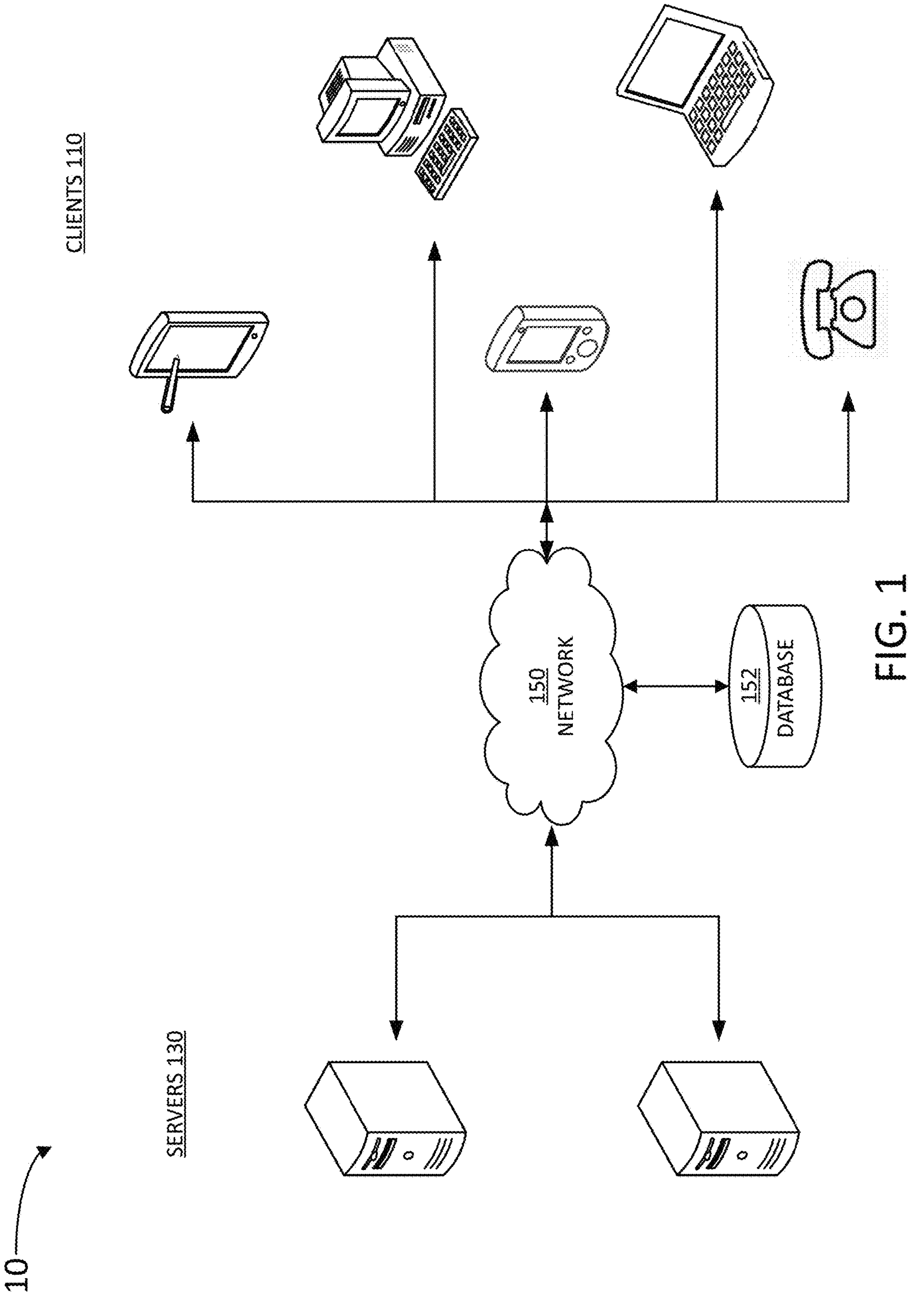
FIG. 1 illustrates an example architecture suitable to provide a platform for a teleconference with multiple participants, according to some embodiments.

FIG. 1 illustrates an example architecture 10 suitable to provide a platform for a teleconference, according to some embodiments. Architecture 100 includes servers 130 and clients 110 connected over a network 150. Servers 130 may include any device having an appropriate processor, memory, and communications capability for hosting the documents and applications associated with a teleconference engine. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like. One of the many servers 130 is configured with a memory including instructions which, when executed by a processor, cause server 130 to perform at least some of the steps in methods as disclosed herein. In some embodiments, the processor in server 130 is configured to host a teleconference that one or more participants may access through client device 110. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing at least one of servers 130.

In some embodiments, the processor in server 130 is configured to provide documents including images, video, and text messaging services to a participant in a teleconference through client device 110. In some embodiments, the documents provided by server 130 to one or more participants may include an application-based document (e.g., a text-rich document such as a Word document, a PDF document, or any other document accessible through a text editing application, including a computer code sequence, and the like), a spreadsheet document (e.g., Excel and the like), a presentation document (e.g., PowerPoint and the like), an XML file, an HTML file, a multi-media file such as a video, audio, image file, or any combination of the above.

In some embodiments, one or more of servers 130 provide a teleconference feed to all the participants, with the contents of the teleconference. The contents of the teleconference, in turn, may include documents, text, and video (e.g., webcam video captures) provided by one or more of participants in the teleconference via client devices 110 (e.g., accessible through a web page or the application running on client devices 110). Information related to, and instructions to handle the teleconference may be stored in a database 152 accessible by a participant through a client device 110. Servers 130 can return images, documents, rich-text documents, and the like intended for a shared use and modification by multiple participants in a teleconference. For purposes of load balancing, multiple servers 130 can host memories including instructions to one or more processors and multiple servers 130 for hosting one or more teleconferences as disclosed herein.

Figure 2:
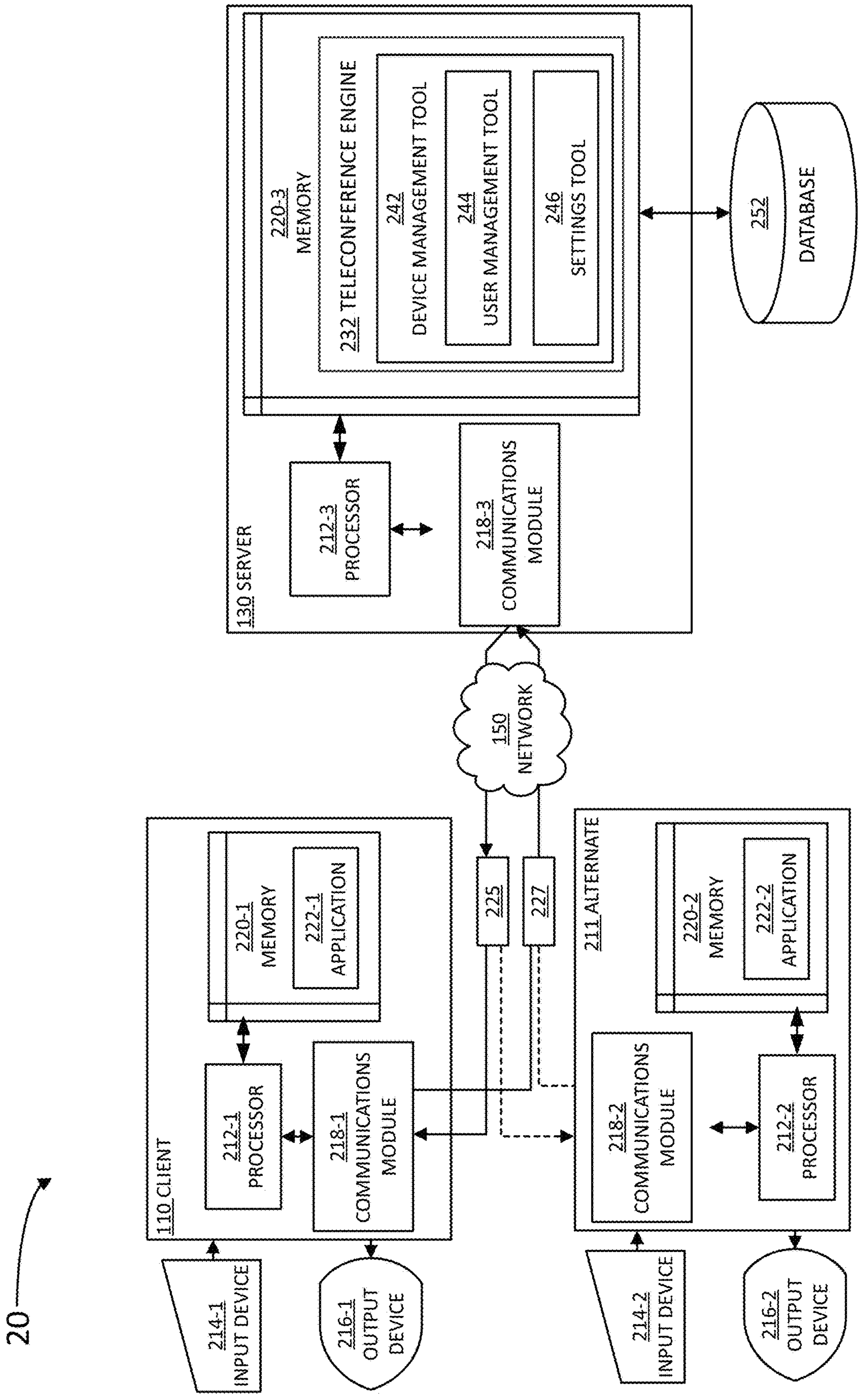
FIG. 2 is a block diagram illustrating an example server and client from the architecture of FIG. 1, according to certain aspects of the disclosure.

FIG. 2 is a block diagram 20 illustrating an example server 130, a client device 110, and an alternate device 211 in the architecture 100 of FIG. 1, according to certain aspects of the disclosure. Client device 110, alternate device 211, and server 130 are communicatively coupled over network 150 via communications modules 218-1, 218-2, and 218-3 (hereinafter, collectively referred to as "communications modules 218"), respectively. Communications modules 218 are configured to interface with network 150 to send and receive information and streamline feeds including data, requests, responses, and commands to other devices on the network. Communications modules 218 can be, for example, modems or Ethernet cards, and include radio hardware and software, such as radio-frequency (RF) antennas, modulators, de-modulators, analog-to-digital converters, and digital-to-analog converters (DAC).

Client device 110 and alternate device 211 may be any one of a desktop computer, a laptop, or a mobile computing device. Client device 110 and alternate device 211 may include processors 212-1 and 212-2 and memories 220-1 and 220-2, respectively. Input devices 214-1 and 214-2 (hereinafter, collectively referred to as "input devices 214") and an output devices 216-1 and 216-2 (hereinafter, collectively referred to as "output devices 216") enable the user (e.g., teleconference participant) to interact with client device 110 and alternate device 211. Examples of input devices 214 and output devices 216 may include a mouse, a keyboard, a display, a touch-interactive display, and the like. In some embodiments, input devices 214 may include a camera, a video camera, and a microphone. Accordingly, client device 110 or alternate device 211 may collect an audio signal, a video signal, or a combination thereof from the user (e.g., in a remote teleconference event, for other participants to see and record), and transmit the signal to a server 130 through communications modules 218-1 and 218-2, respectively. In some embodiments, client device 110 is a computer (e.g., desktop computer, mobile computer, or smart phone), and alternate device 211 is a video camera (e.g., a webcam, and the like), an audio player, or some other accessory having network connectivity. In some embodiments, alternate device 211 is a telephone or a remote interphone that the participant may want to use during the teleconference, or for at least a part of the teleconference. For example, in some embodiments, alternate device 211 may be a network-based assistant that provides information or answers to participant's questions during the teleconference. In yet other embodiments, alternate device 211 may be paired or synchronized to client device 110. In some embodiments, server 130 synchronizes data packets 227 coming from either of client device 110 or alternate device 211, or both, into a single feed from the same participant, and produces a teleconference feed in data packet 225 that shows the combined packets from client device 110 and from alternate device 211 as coming from one and the same participant.

Server 130 includes a memory 220-3, a processor 212-3, and communications module 218-3. The user interface is displayed for the user in an output device 216 of client device 110. Memory 220-3 includes a teleconference engine 232 to enable server 130 to support a network-based teleconference of multiple remote participants (e.g., users of client devices 110). Teleconference engine 232 may also include a device management tool 242, a user management tool 244, and a settings tool 246. Server 130 may also be communicatively coupled with a database 252, storing data and information collected from or provided to the multiple participants of a teleconference, before or after the teleconference starts or the teleconference ends. Teleconference engine 232 includes instructions which, when executed by processor 212-3, cause server 130 to perform at least partially steps as disclosed herein. For example, teleconference engine 232 includes instructions to communicate with applications 222-1 and 222-2 in client device 110 or alternate device 211, respectively (hereinafter, collectively referred to as "applications 222"), to incorporate their user as a participant of a teleconference, as disclosed herein. Teleconference engine 232 may also include instructions to store a history log and other data related to a teleconference as disclosed herein into database 252. Furthermore, in some embodiments, teleconference engine 232 may include instructions to retrieve at least some of the data in database 252 and provide to one or more participants in a teleconference, as disclosed herein. Processors 212-1, 212-2, and 212-3, and memories 220-1, 220-2, and 220-3 will be collectively referred to, hereinafter, as "processors 212" and "memories 220," respectively.

In some embodiments, teleconference engine 232 stores and maintains for a selected period of time, data in database 252. Further, teleconference engine 232 updates different changes and modifications on a document or file discussed during the teleconference, as part of a chat/topic history, as stored in database 252. As mentioned above, server 130 provides, via network 150, a data packet 225 to client device 110. In some embodiments, data packet 225 is a feed with a video content of the teleconference, provided to all participants. Accordingly, data packet 225 may include documents, text files, audio files, graphic files, and/or video files or streams, that are configured to be displayed by application 222. In some embodiments, data packet 225 may be provided by server 130 to alternate device 211, as part of the teleconference feed to the same participant that handles client device 110. Likewise, each of client devices 110 may provide a data packet 227 to server 130, via network 150. Data packet 227 may include a video feed from each participant in the teleconference, or a shared document, screenshot, file, and the like. In some embodiments, data packet 227 may be provided to server 130 by alternate device 211. Alternate device 211 may be associated with the same teleconference participant that controls client device 110, and so data packets 225 and 227 may be transmitted between alternate device 211 and server 130 either via client device 110 or directly through network 150.

A participant may access a teleconference hosted by teleconference engine 232 through applications 222 installed in memories 220-1 and 220-2 of client device 110 and/or alternate device 211. The participant may also access the teleconference hosted by teleconference engine 232 via a web browser installed in either of client device 110 or alternate device 211. Processors 212-1 and 212-2 control execution of applications 222. In some embodiments, applications 222 are downloaded and installed by the participant into client device 110 or alternate device 211, from server 130.

Processor 212-3 is configured to execute instructions, such as instructions physically coded into processor 212-3, instructions received from software in memory 220-3, or a combination thereof. A participant using client device 110 or alternate device 211 may submit, through input devices 214, a document or a media file (e.g., a video or an audio stream) to teleconference engine 232 via a user interface of applications 222. The document or multi-media file submitted by the participant may include an application-based document (e.g., a text-rich document such as a Word document, a PDF document, or any other document accessible through a text editing application, including a computer code sequence, and the like), a spreadsheet document (e.g., Excel and the like), a presentation document (e.g., PowerPoint and the like), an XML file, an HTML file, or a multi-media file such as a video, audio, image file, or any combination of the above.

More specifically, teleconference engine 232 may include a device management tool 242 configured to incorporate client device 110 and alternate device 211 to the same participant feed in the teleconference. Device management tool 242 may be configured to receive a credential including an authorization code in data packet 227 from alternate device 211 (or from client device 110) requesting access to the teleconference. Teleconference engine 232 may also include a user management tool 244 and a settings tool 246. User management tool 244 may include a registry of multiple devices (e.g., client device 110, alternate device 211, and others) associated to each participant in the teleconference. Settings tool 246 may be configured to set up, update, and maintain the credentials and authorization codes, as well as the specifications of input devices 214 and 216. Accordingly, in some embodiments, teleconference engine 232 may deny access to the teleconference on the basis of an outdated, obsolete, or incompatible hardware/software configuration of alternate device 211.

Figure 3A:
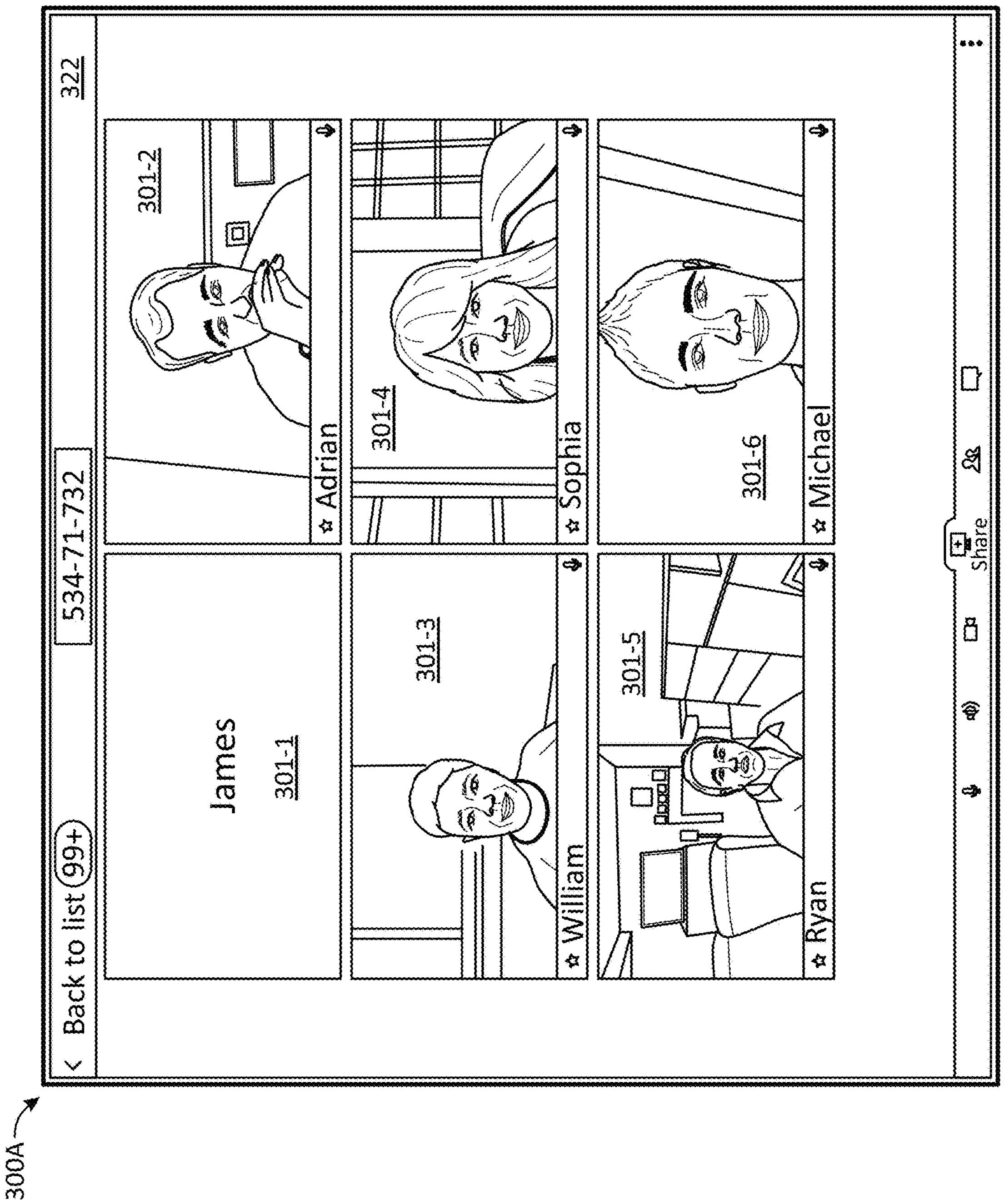
FIGS. 3A-3C illustrate screenshots of an application running multiple stages of a teleconference with multiple participants, according to some embodiments.
Figure 3B:
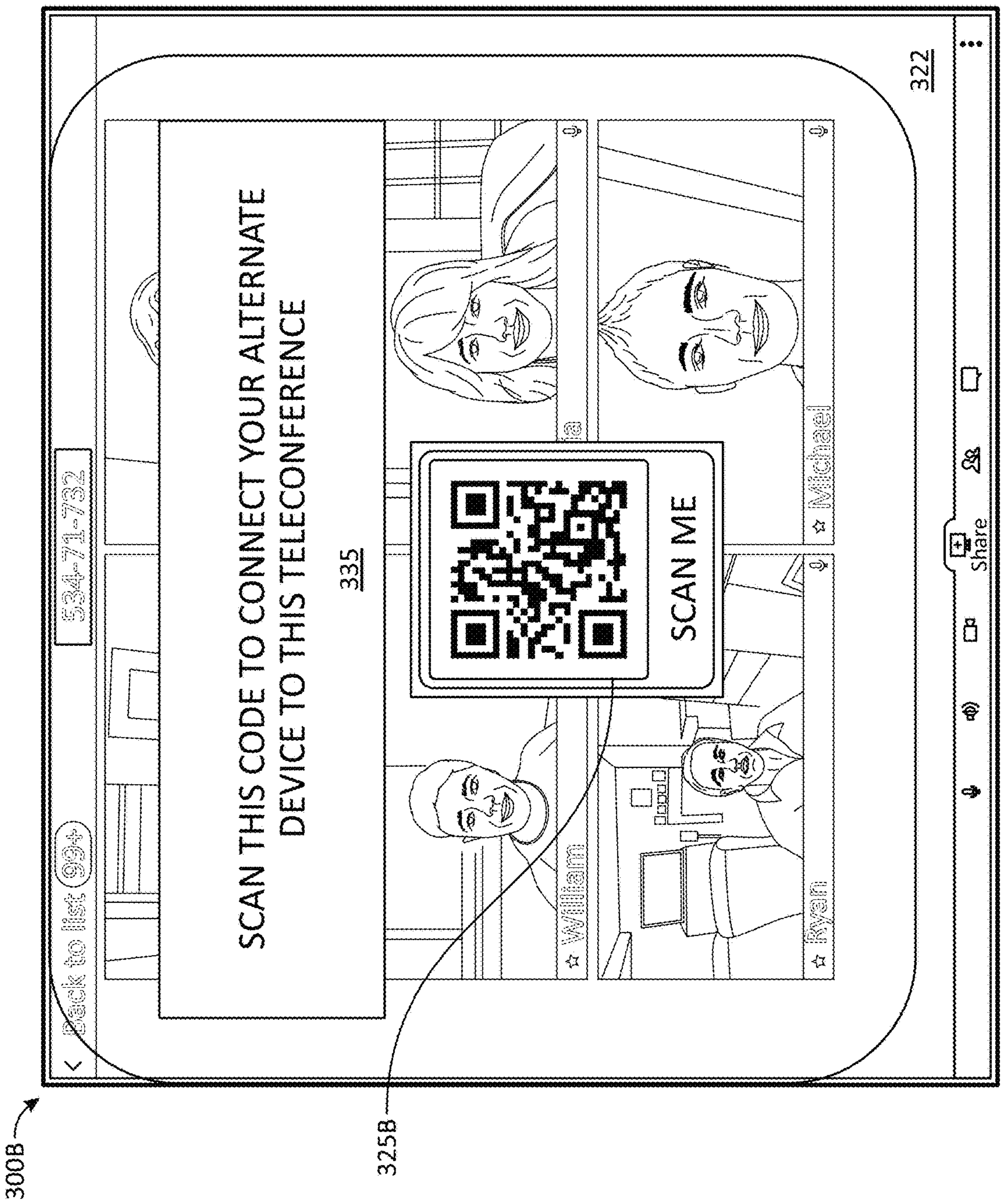
Figure 3C:
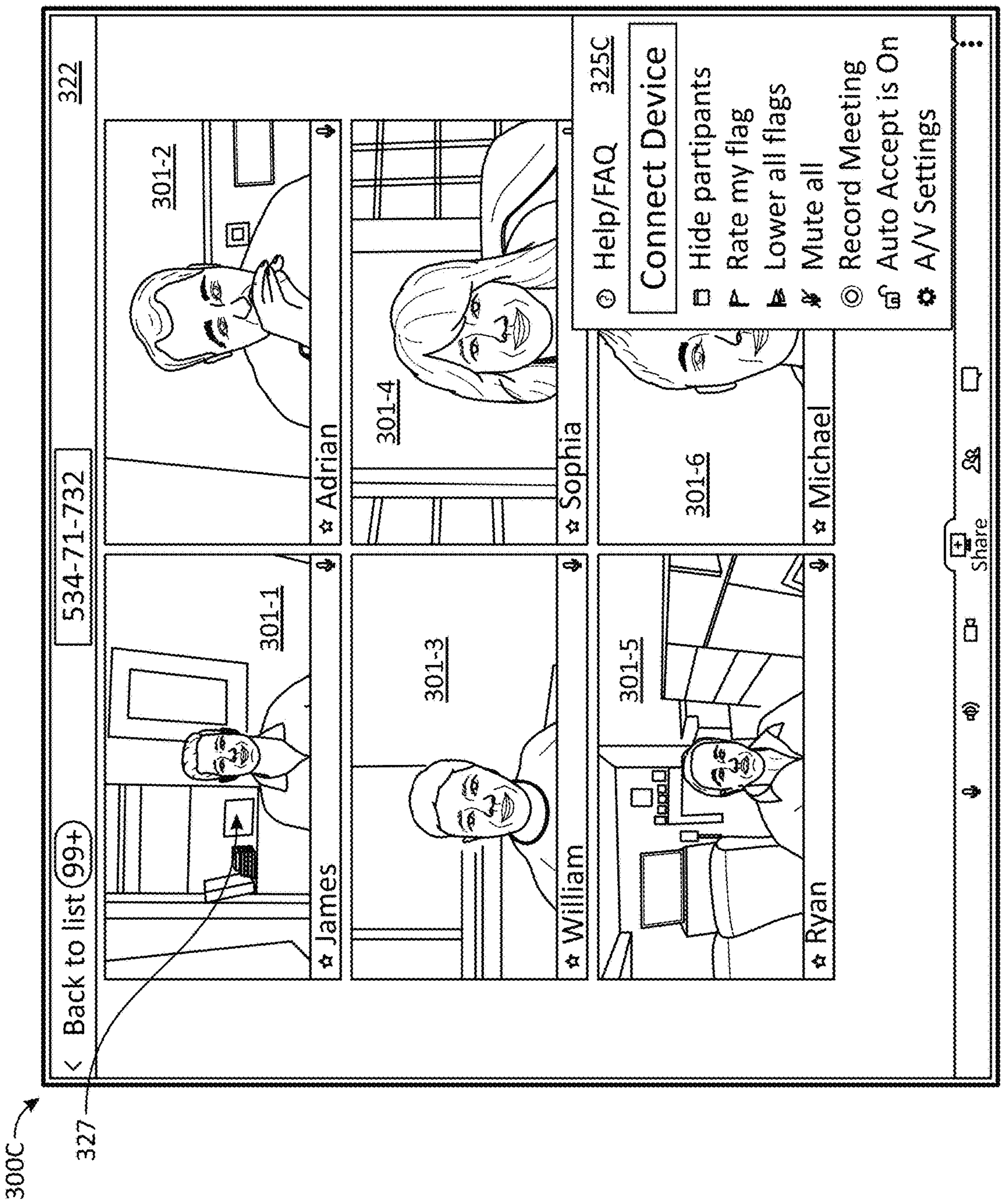

FIGS. 3A-3C illustrate screenshots of an application 322 running multiple stages 300A, 300B, and 300C (hereinafter, collectively referred to as "stages 300") of a teleconference with multiple participants 301-1, 301-2, 301-3, 301-4, 301-5, and 301-6 (hereinafter, collectively referred to as "participants 301"), according to some embodiments. In some embodiments, participant 301-1 may want to use the alternate device to provide a pre-selected data stream (e.g., a video or multimedia file stored in the alternate device, streaming from a browser, or being captured in real time by the participant). Participant 301-1 then makes the request to the teleconference host and receives a code 325B. When participant 301-1 scans code 325B with the alternate device, the data stream from the alternate device is transferred to the teleconference feed (e.g., independently from the first client device, through the internet connectivity of the alternate device). In yet other embodiments, one of participants 301 may prefer to use the alternate device to provide better quality of a data stream (e.g., better video quality). Accordingly, any one of participants 301 may desire to switch audio and/or video data feed to the alternate device. For example, one of participants 301 may have to walk out of a conference room with the alternate device.

FIG. 3A illustrates first stage 300A wherein a participant 301-1 of a teleconference joins using a first client device (e.g., a desktop computer and the like). The first client device has the authorization credentials for the participant to enter the teleconference and receive the feed for the teleconference. However, the first client device has no video capability. This may be a spontaneous technical issue with the first client device, it may be a technical setting in the first client device, or may simply be that the first client device lacks the video capability.

FIG. 3B illustrates second stage 300B, wherein one of participants 301 requests to connect an alternate device into the teleconference. In some embodiments, the first participant may select the menu by a right-click or by clicking on a tab provided by the teleconference application installed in the first client device. The participant receives a code 325B from the teleconference engine, including a message 335 (e.g., "scan this code to connect your alternate device to this call"). More generally, the alternate device may be any other electronic appliance coupled with a network, and instead of a QR code, the teleconference application may provide any other code 325B to the alternate device. For example, in some embodiments, the teleconference application may provide an SMS text message to the alternate device, wherein the SMS text includes a universal resource locator (URL) address for a web page. The code (e.g., the QR code or SMS text message and the like) causes the alternate device to connect to the selected teleconference with all the right settings and authentication and authorization. In some embodiments, the teleconference application is configured to display the QR code on the screen of the first device. Accordingly, in some embodiments, a browser built in the alternate device may be able to handle the URL address in the QR code.

FIG. 3C illustrates third stage 300C, wherein the teleconferencing application provides a QR code on the display of the first client device. Participant 301-1 then accesses the text message on the alternate device, which contains the link. Upon clicking on it, stage 300C brings the alternate device into the teleconference, associated with participant 301-1. A "connect device" menu 325C is displayed for participant 301-1. The alternate device is automatically directed through a network into the teleconference stream. In some embodiments, the data stream (e.g., video stream 327) from the alternate device may be linked to the feed associated with the first participant in the teleconference. In third stage 300C, the alternate device may be a smart phone, and the first device may be a desktop computer.

More generally, embodiments as disclosed herein include a teleconference application that is able to control alternate input devices remotely, using available mechanisms for those devices. In some embodiments, the alternate device may include a speakerphone or other sound device configured to receive a voice input, and provide a voice output configured to respond to a voice query by a user (e.g., a participant in the teleconference). In such configuration, the first client device may generate a sound that the listening device can receive as a prompt for accessing a URL or the remote server hosting the teleconference application. In some embodiments, the sound prompt includes a code that the sound device may interpret to access the URL or the server hosting the teleconference application. In some embodiments, the first client device may generate a pre-selected key phrase that the operator would read aloud, e.g., three pre-selected random words, to cause the sound device to access the teleconference URL or server.

In stage 300C, a video stream from the alternate device is provided to the teleconference, associated with the first participant. The teleconference application incorporates the data stream from the alternate devices synchronously to the feed associated with the specific participant.

Figure 4:
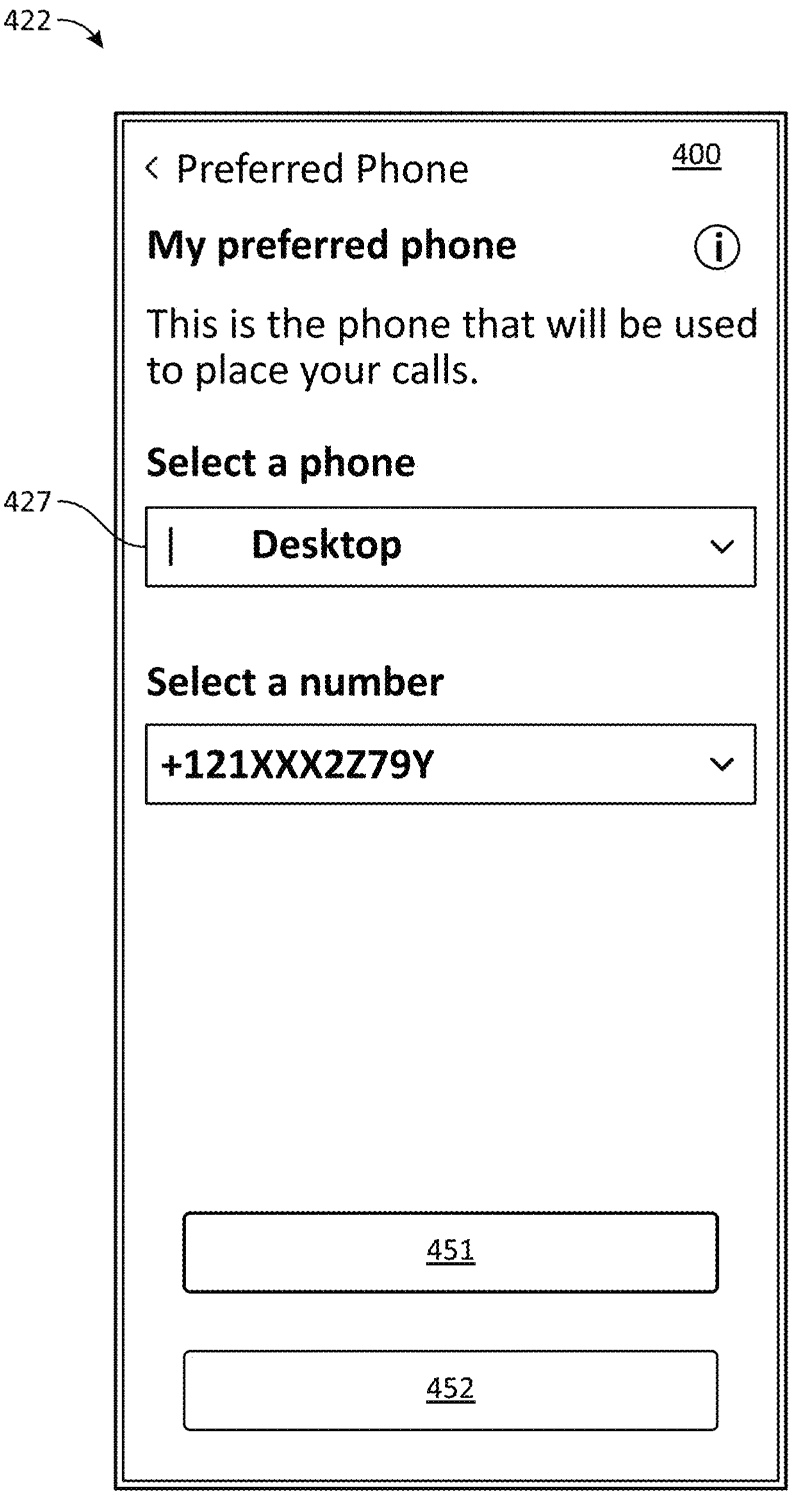
FIG. 4 illustrates a menu provided by a teleconference application offering multiple alternate devices to link to a feed for one participant of the teleconference, according to some embodiments.

FIG. 4 illustrates a widget 400 provided by a teleconference application 422 offering multiple alternate devices (e.g., a desktop 427, and the like) to link to a feed for one participant of the teleconference, according to some embodiments. Tabs 451 and 452 may be included in widget 400 to either proceed or cancel the selection made by the participant.

Figure 5:
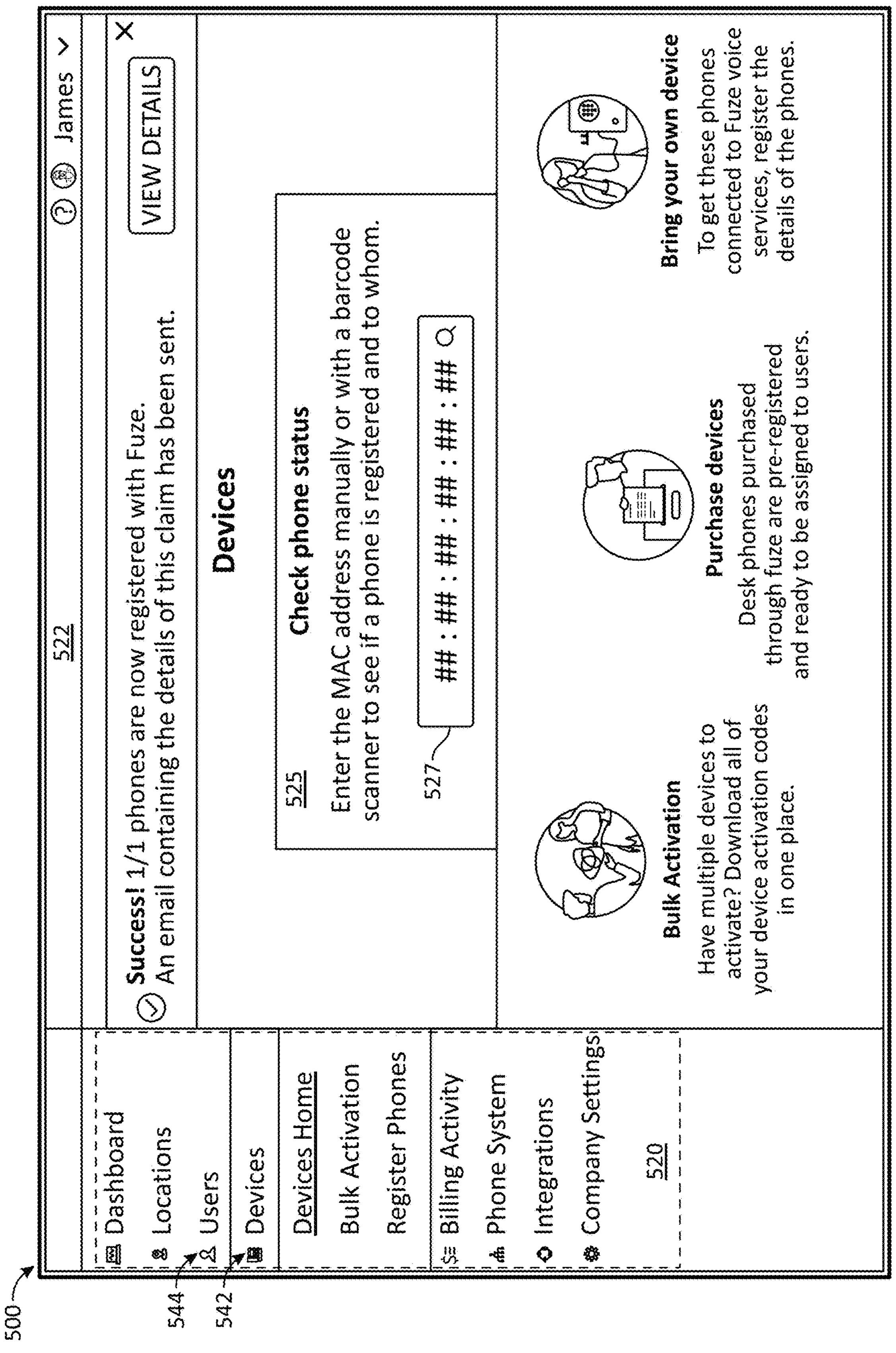
FIG. 5 illustrates screenshots of a teleconference application offering a link to a telephone for one participant of the teleconference, according to some embodiments.

FIG. 5 illustrates a screenshot 500 of a teleconference application 522 offering a link 525 to a telephone for one participant of the teleconference, according to some embodiments. A tools menu 520 may link to a device management tool 542 and a user management tool 544 (cf. device management tool 242 and user management tool 244). Link 525 may prompt a participant to enter a web address 527 (e.g., a MAC address), or a serial number and the like, of the telephone, which is to be entered as an alternate device for the participant.

Figure 6:
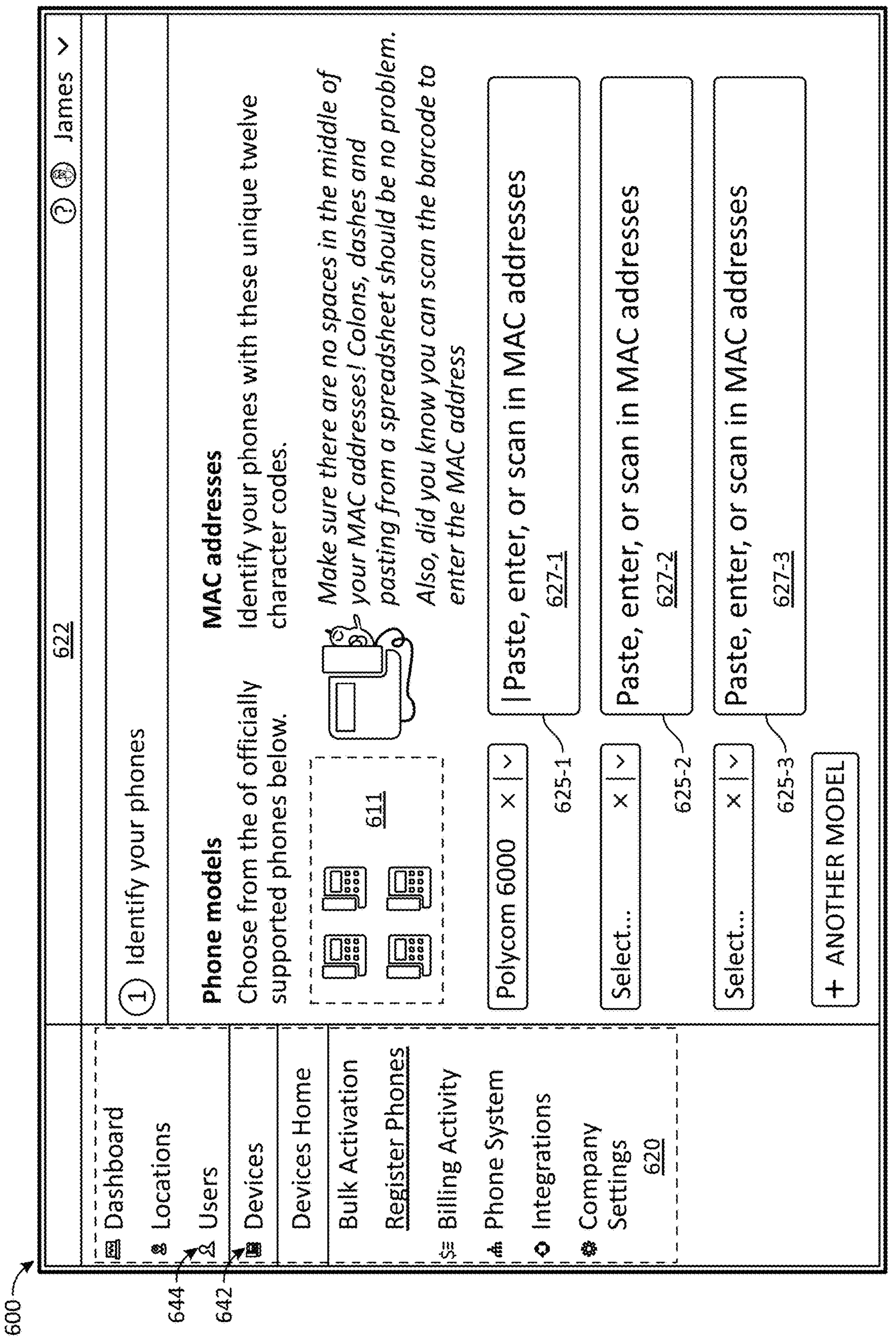
FIG. 6 illustrates a screenshot of a teleconference application offering multiple links to alternate devices for one participant of the teleconference, according to some embodiments.

FIG. 6 illustrates a screenshot 600 of a teleconference application 622 offering multiple links 625-1, 625-2, and 625-3 (hereinafter, collectively referred to as "links 625"), to alternate devices 611 for one participant of the teleconference, according to some embodiments. A tools menu 620 may link to a device management tool 642 and a user management tool 644 (cf. device management tools 242 and 542 and user management tool 244 and 544). The participant may fill in each of links 625 with a specific serial number, MAC address, and the like 627-1, 627-2, and 627-3 (hereinafter, collectively referred to as "addresses 627"), for the one or more alternate devices that will be associated with one and the same participant.

Figure 7:
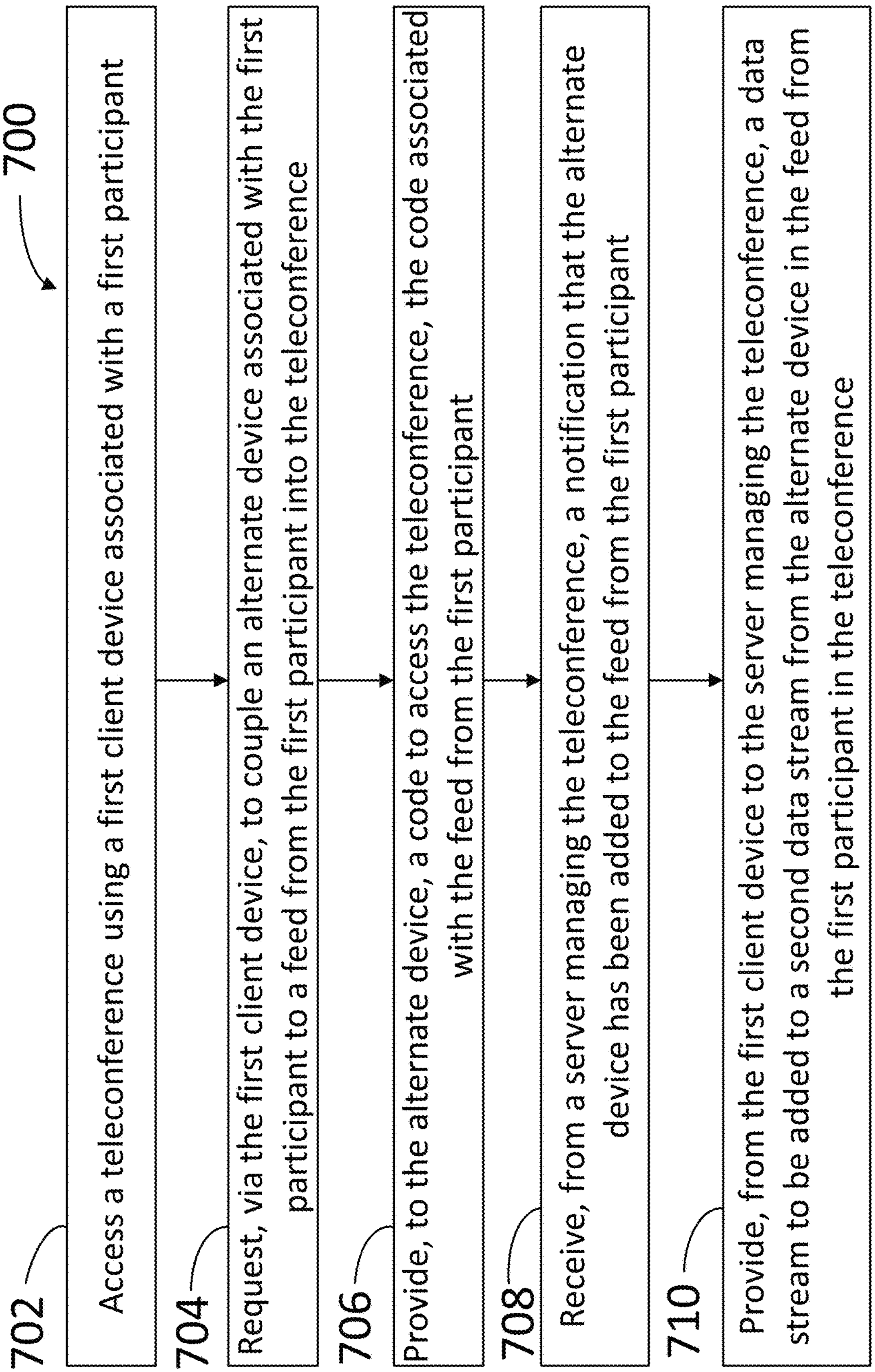
FIG. 7 is a flowchart illustrating steps in a method for adding an alternate device associated with a participant to a teleconference, according to some embodiments.

FIG. 7 is a flowchart illustrating steps in a method 700 for adding an alternate device associated with a participant to a teleconference, according to some embodiments. Method 700 may be performed at least partially by any one of the network servers hosting a teleconference for multiple remote participants using client devices communicatively coupled with the network server through a network, using a communication module (e.g., server 130, client devices 110, alternate devices 211 and 611, network 150, and communication modules 218). The network server may include a teleconference engine, a device management tool, a user management tool, and a settings tool (e.g., teleconference engine 232, device management tool 242, 542, and 642, user management tool 244, 544, and 644, and settings tool 246), as disclosed herein. At least some of the steps in method 700 may be performed by a computer having a processor executing commands stored in a memory of the computer (e.g., processors 212 and memories 220). For example, at least some of the commands may be included in an application installed in a client device accessible by a user (e.g., applications 222). Further, steps as disclosed in method 700 may include retrieving, editing, and/or storing files in a database that is part of, or is communicably coupled to, the computer (e.g., database 252). Methods consistent with the present disclosure may include at least some, but not all, of the steps illustrated in method 700, performed in a different sequence. In some embodiments, at least one or more of the steps in method 700 may be performed by one or more of the devices and systems illustrated in FIGS. 1-2. Moreover, a method as disclosed herein may include at least one of the steps in method 700 performed in a different order, simultaneously, quasi-simultaneously, or overlapping in time.

Step 702 includes accessing a teleconference using a first client device associated with a first participant.

Step 704 includes requesting, via the first client device, to couple an alternate device associated with the first participant to a feed from the first participant into the teleconference. In some embodiments, step 704 includes the participant walking away from a teleconference and still desiring to participate from a personal mobile device.

Step 706 includes providing, to the alternate device, a code to access the teleconference, the code associated with the feed from the first participant. In some embodiments, step 706 includes verifying the code to access the teleconference event prior to adding the data stream from the alternate device to the feed from the first participant. In some embodiments, the alternate device is a smart phone, the code to access the teleconference event is a QR code, and the data stream is a video stream from a camera in the smart phone. In some embodiments, the code to access the teleconference event is configured to cause the alternate device to access a network address associated with the teleconference event. In some embodiments, the alternate device may be a hardware component already registered with the teleconference host (e.g., a landline). The landline or hardware device may have a registration code (e.g., on the bottom of the telephone), which the participant may type into a prompt from the teleconference application to connect the hardware to the teleconference, associated with the participant.

Step 708 includes receiving, from a server managing the teleconference, a notification that the alternate device has been added to the feed from the first participant.

Step 710 includes providing, from the first client device to the server managing the teleconference, a data stream to be added to a second data stream from the alternate device in the feed from the first participant in the teleconference. In some embodiments, the first client device is installed in a conference room and the alternate device is a personal mobile device of the first participant, and further includes authorizing the alternate device to control a hardware device in the conference room. In some embodiments, step 710 includes enabling the first participant to start a screen sharing from the alternate device into the teleconference. In some embodiments, step 710 includes receiving, from the alternate device, a command to modify a second feed from a second participant in the teleconference. In some embodiments, the data stream from the alternate device includes a shared content for all the participants in the teleconference. In some embodiments, step 710 includes receiving, from the alternate device, a request to add a second participant to the teleconference. In some embodiments, step 710 includes upgrading a status of the first participant and providing a full stream of the teleconference in the alternate device, to the first participant.

Figure 8:
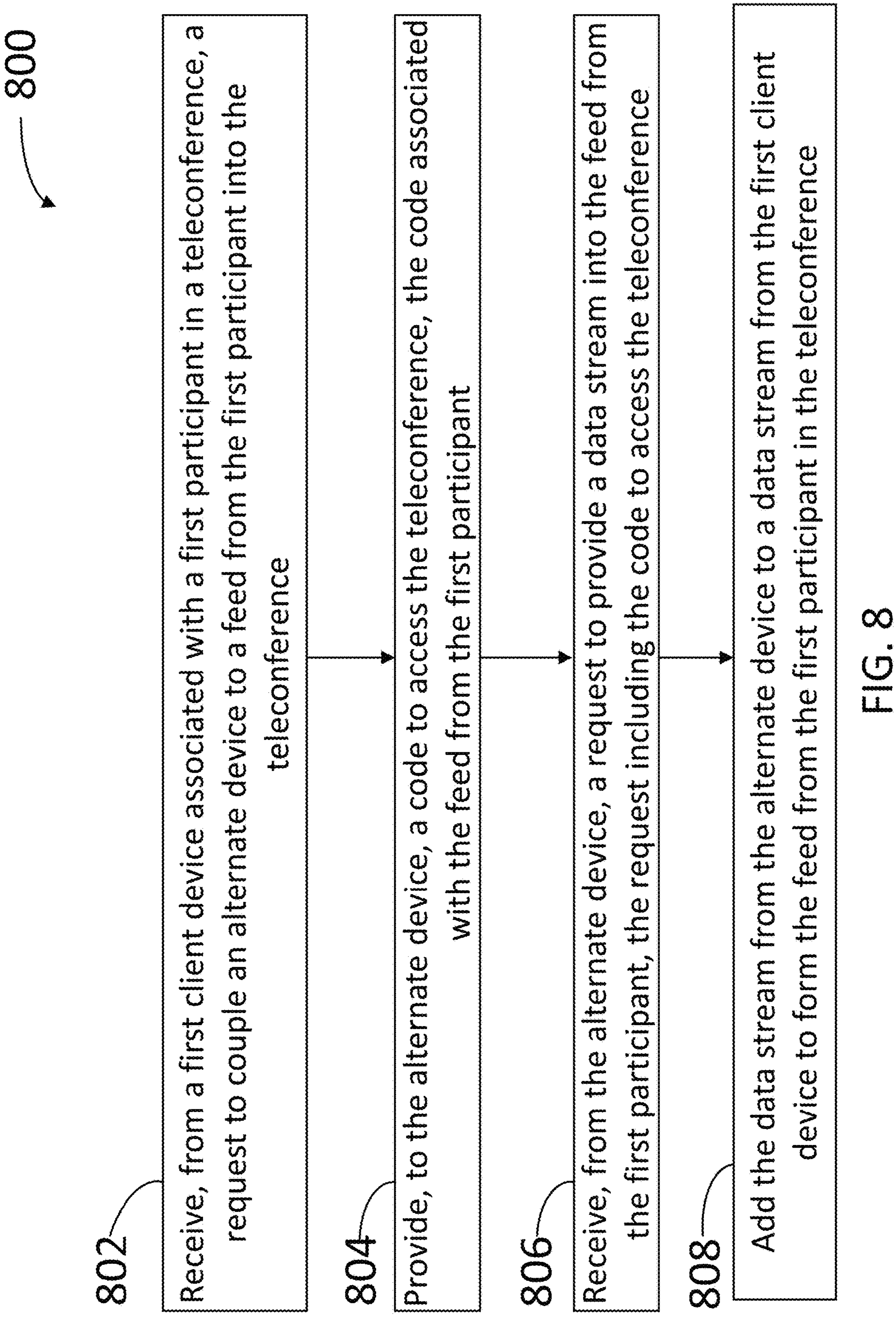
FIG. 8 is a flowchart illustrating steps in a method for managing a teleconference with multiple participants, according to some embodiments.

FIG. 8 is a flowchart illustrating steps in a method 800 for managing a teleconference with multiple participants, according to some embodiments. Method 800 may be performed at least partially by any one of the network servers hosting a teleconference for multiple remote participants using client devices communicatively coupled with the network server through a network, using a communication module (e.g., server 130, client devices 110, alternate devices 211 and 611, network 150, and communication modules 218). The network server may include a teleconference engine, a device management tool, a user management tool, and a settings tool (e.g., teleconference engine 232, device management tool 242, 542, and 642, user management tool 244, 544, and 644, and settings tool 246), as disclosed herein. At least some of the steps in method 800 may be performed by a computer having a processor executing commands stored in a memory of the computer (e.g., processors 212 and memories 220). For example, at least some of the commands may be included in an application installed in a client device accessible by a user (e.g., applications 222). Further, steps as disclosed in method 800 may include retrieving, editing, and/or storing files in a database that is part of, or is communicably coupled to, the computer (e.g., database 252). Methods consistent with the present disclosure may include at least some, but not all, of the steps illustrated in method 800, performed in a different sequence. In some embodiments, at least one or more of the steps in method 800 may be performed by one or more of the devices and systems illustrated in FIGS. 1-2. Moreover, a method as disclosed herein may include at least one of the steps in method 800 performed in a different order, simultaneously, quasi-simultaneously, or overlapping in time.

Step 802 includes receiving, from a first client device associated with a first participant in a teleconference, a request to couple an alternate device to a feed from the first participant into the teleconference.

Step 804 includes providing, to the alternate device, a code to access the teleconference, the code associated with the feed from the first participant.

Step 806 includes receiving, from the alternate device, a request to provide a data stream into the feed from the first participant, the request including the code to access the teleconference.

Step 808 includes adding the data stream from the alternate device to a data stream from the first client device to form the feed from the first participant in the teleconference. In some embodiments, step 808 includes switching the feed of the first participant in the teleconference from the first client device to the alternate device. In some embodiments, step 808 includes providing, to the first client device, a menu list of devices including the alternate device to join the feed from the first participant. In some embodiments, the alternate device is a telephone including the code to access the teleconference, further including switching the feed from the first participant to the telephone. In some embodiments, step 808 includes adding one of an audio stream, a video stream, or a data from an application running in the alternate device.

Hardware Overview

Figure 9:
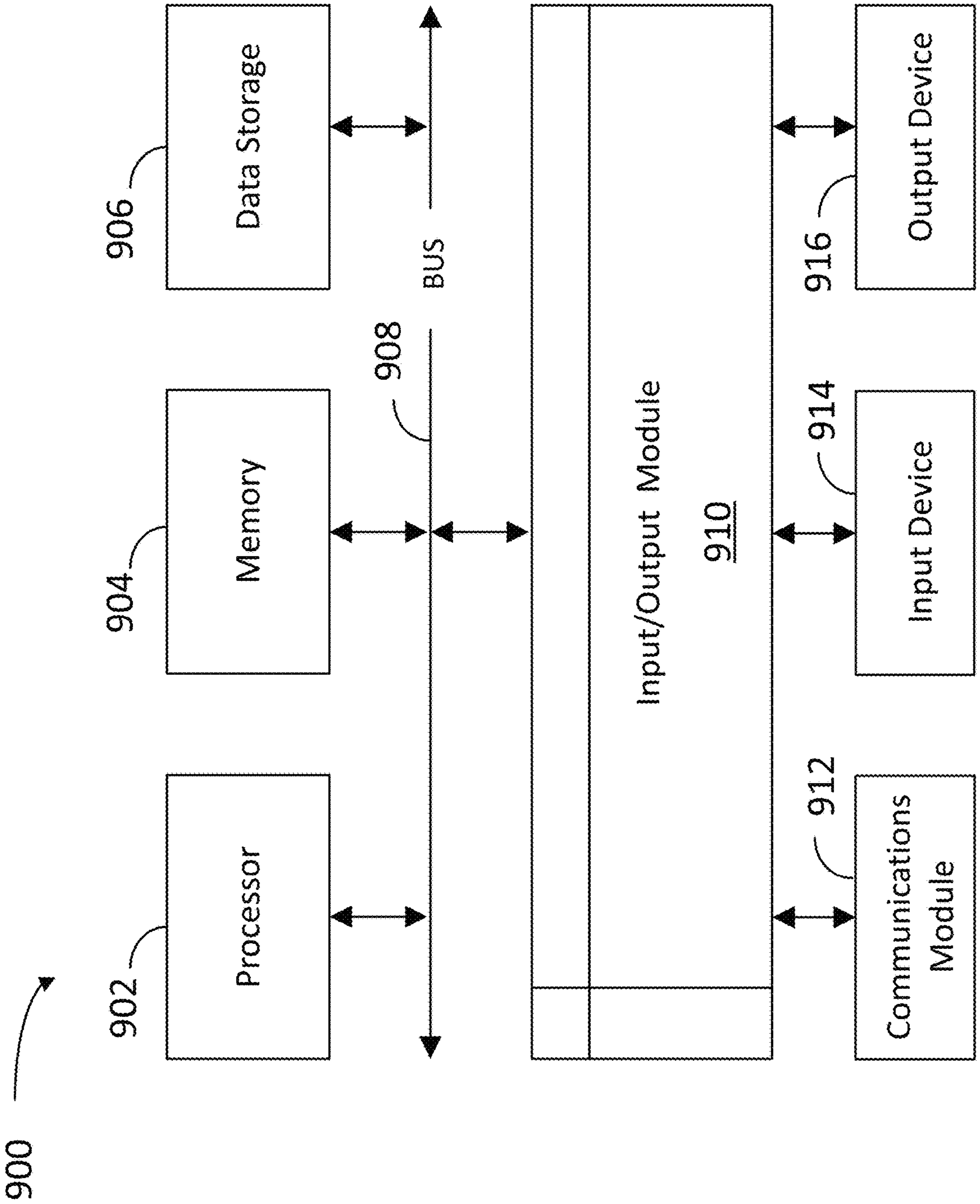
FIG. 9 is a block diagram illustrating an example computer system with which the client and server of FIGS. 1-3, and the methods of FIGS. 7 and 8 can be implemented, according to some embodiments.

FIG. 9 is a block diagram illustrating an exemplary computer system 900 with which the client device 110 and server 130 of FIGS. 1-2, and the methods of FIGS. 7 and 8 can be implemented. In certain aspects, the computer system 900 may be implemented using hardware or a combination of software and hardware, either in a dedicated server, or integrated into another entity, or distributed across multiple entities.

Computer system 900 (e.g., client device 110, alternate device 211, and server 130) includes a bus 908 or other communication mechanism for communicating information, and a processor 902 (e.g., processors 212) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, a code that creates an execution environment for the computer program in question, e.g., code that constitutes processor firmware, a protocol stack, a database management system, an operating system, or a combination of one or more of them stored in an included memory 904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, a special purpose logic circuitry.

The instructions may be stored in the memory 904 and implemented in one or more computer program products, i.e., one or more modules of computer program instructions encoded on a computer-readable medium for execution by, or to control the operation of, the computer system 900, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client device 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship with each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that include bus 908. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:

receiving, at a server hosting a teleconference and from a first client device associated with a first participant in the teleconference or from an alternate device, a request to couple the alternate device to a feed from the first client device, wherein the first client device and the alternate device are controlled by the first participant in the teleconference, the first client device and the alternate device are registered with the server hosting the teleconference using a registry communicatively coupled with a teleconference application prior to the teleconference, wherein the teleconference application comprises at least a device management tool on the server hosting the teleconference, the first participant used the device management tool to enter a serial number or a MAC address for the alternate device to register the alternate device with the server hosting the teleconference with which the first client device is registered, and the alternate device is selected from the registry comprising multiple devices associated with the first participant;

providing, to the alternate device, a code associated with the feed and selectable by the alternate device to enable the alternate device to join into the teleconference via the feed with appropriate settings and authorization data in response to selection of the code via the alternate device;

receiving, from the alternate device, a request to add a data stream from the alternate device into the feed, the request to provide the data stream comprising the code associated with the feed;

providing, from the first client device, data packets to be combined with the data stream; and synchronizing the data packets and the data stream to form a single teleconference feed that includes the data packets and the data stream, wherein the synchronizing produces the single teleconference feed that presents the data packets and the data stream as coming from the first participant, and wherein each of the first client device and the alternate device includes communications circuitry enabled to communicate data over at least one data-communications network.

2. The computer-implemented method of claim 1, further comprising receiving, from the alternate device controlled by the first participant, a request to add a second participant to the teleconference.

3. The computer-implemented method of claim 1, further comprising providing, to the first client device, a menu list of devices including identification information of the alternate device and the code to join the feed from the first participant, wherein the server responds to a selection of the alternate device and, in response to the selection, the alternate device is connected to the teleconference.

4. The computer-implemented method of claim 1, wherein the alternate device is or includes a telephone using the code to join the feed, and the method further includes switching the feed from the first participant to the telephone.

5. The computer-implemented method of claim 1, wherein adding the data stream from the alternate device to the feed from the first participant includes adding one of an audio stream, a video stream, or a set of data from an application running in the alternate device, in which the feed includes the data stream from the alternate device and data from the first client device, and providing a full stream of the teleconference of the first client device to the first participant.

6. The computer-implemented method of claim 1, wherein the alternate device is a smart phone, the code to join the feed is a QR code, and the data stream from the alternate device is a video stream from a camera in the smart phone.

7. The computer-implemented method of claim 1, wherein the code to join the feed is configured to cause the alternate device to access a network address associated with the teleconference.

8. The computer-implemented method of claim 1, wherein the first client device is installed in a conference room and the alternate device is a mobile device of the first participant, and the method further comprises authorizing the alternate device to control a hardware device in the conference room.

9. The computer-implemented method of claim 1, further comprising receiving, from the alternate device controlled by the first participant, a command to modify a second feed from a second participant in the teleconference.

10. The computer-implemented method of claim 1, further including providing to the first client device a prompt on a display of the first client device, to enter identification information to be used for identifying the alternate device before the alternate device is to be connected to the teleconference.

11. A data-communications system comprising:

a set of one or more servers ("the server set") to provide data-communications services that involve network connectivity for conveying data to host a teleconference in response to a request from a first client device, associated with a first participant as a teleconference participant, to couple an alternate device to a feed from the first client device, wherein the first client device and the alternate device are controlled by the first participant in the teleconference, the first client device and the alternate device are registered with the server set hosting the teleconference using a registry communicatively coupled with a teleconference application prior to the teleconference, wherein the teleconference application comprises at least a device management tool on a server of the server set hosting the teleconference, the first participant used the device management tool to enter a serial number or a MAC address for the alternate device to register the alternate device with the server set hosting the teleconference with which the first client device is registered, and the alternate device is selected from the registry comprising multiple devices associated with the first participant;

the server set further configured to cause a code for access to the teleconference, to be provided to the alternate device over at least one data-communications network, wherein the code is associated with the feed and is selectable by the alternate device to enable the alternate device to join into the teleconference via the feed with appropriate settings and authorization data in response to selection of the code via the alternate device;

receive, from the alternate device or the first client device, a request to add a data stream from the alternate device into the feed, the request to provide the data stream comprising the code associated with the feed;

receive, from the first client device, data packets on a first channel to be combined with the data stream on a second channel separate from the first channel; and cause the data stream on the second channel to be added to the data packets on the first channel to be included in the feed, wherein the feed and the data stream are synchronized to form a single teleconference feed that includes the data stream and the data packets, and each of the first client device and the alternate device includes communications circuitry enabled to communicate data over the at least one data-communications network.

12. The data-communications system of claim 11, wherein the data stream from the alternate device comprises additional data packets, and the server set synchronizes the data packets and the additional data packets, into the feed as the single teleconference feed.

13. The data-communications system of claim 11, wherein the alternate device is configured as a network-based assistant device that provides information or answers to participant questions during the teleconference.

14. The data-communications system of claim 11, wherein the server set verifies the code to access the teleconference prior to adding the data stream from the alternate device to the feed from the first participant, and the code is a QR code.

15. The data-communications system of claim 11, wherein the server set is configured as multiple servers cooperatively configured to provide the data-communications services, and the server set is to receive the request to add the data stream.

16. The data-communications system of claim 11, wherein the server set includes multiple servers that cooperatively share memories for hosting the teleconference.

17. The data-communications system of claim 11, wherein the server set conveys data for shared use and modification by multiple participants in the teleconference.

18. The data-communications system of claim 11, wherein the code enables the alternate device to connect to the teleconference with settings and authentication and authorization for automatically connecting to the teleconference in response to a user selection.

19. The data-communications system of claim 11, wherein the server set is to receive data indicating that the first client device and the alternate device are linked and authorized for use, including connecting to the teleconference, by the first participant.

20. The data-communications system of claim 11, wherein the server set receives a request to add a second participant to the teleconference from the alternate device.

* * * * *